/

US009361078B2

(12) United States Patent  
Gao et al.

(10) Patent No.: US 9,361,078 B2  
(45) Date of Patent: Jun. 7, 2016

(54) COMPILER METHOD OF EXPLOITING DATA VALUE LOCALITY FOR COMPUTATION REUSE

(75) Inventors: Yaoqing Gao, North York (CA); Liangxiao Hu, North York (CA); Guansong Zhang, Markham (CA); Peng Zhao, North York (CA)

(73) Assignee: International Business Machines Corporation, Armonk, NY (US)

( * ) Notice: Subject to any disclaimer, the term of this patent is extended or adjusted under 35 U.S.C. 154(b) by 2941 days.

(21) Appl. No.: 11/688,090

(22) Filed: Mar. 19, 2007

(65) Prior Publication Data

US 2008/0235674 A1 Sep. 25, 2008

(51) Int. Cl.  
*G06F 9/45* (2006.01)  
*G06F 9/38* (2006.01)

(52) U.S. Cl.  
CPC .............. *G06F 8/4441* (2013.01); *G06F 9/383* (2013.01); *G06F 9/3851* (2013.01)

(58) Field of Classification Search  
None  
See application file for complete search history.

(56) References Cited

U.S. PATENT DOCUMENTS

| | | | |
|---|---|---|---|
| 5,845,103 A * | 12/1998 | Sodani et al. | 712/216 |
| 6,052,529 A * | 4/2000 | Shindo | 717/153 |
| 6,401,187 B1 * | 6/2002 | Motokawa et al. | 711/213 |
| 6,625,725 B1 * | 9/2003 | Wu et al. | 712/245 |
| 6,658,648 B1 | 12/2003 | Douceur et al. | |
| 6,772,415 B1 * | 8/2004 | Danckaert et al. | 717/161 |
| 7,383,543 B2 * | 6/2008 | Wu | 717/153 |
| 7,458,065 B2 * | 11/2008 | Sanchez et al. | 717/131 |
| 7,460,126 B2 * | 12/2008 | Grantham et al. | 345/505 |
| 2003/0101442 A1 | 5/2003 | Wu | |
| 2005/0071438 A1 * | 3/2005 | Liao et al. | 709/214 |
| 2005/0246700 A1 * | 11/2005 | Archambault et al. | 717/156 |
| 2007/0088915 A1 * | 4/2007 | Archambault et al. | 711/137 |

OTHER PUBLICATIONS

Wu et al., "Better Exploration of Region-Level Value Locality with Integrated Computation Reuse and Value Prediction", 2001, IEEE.*  
Ding et al., "Compiler Scheme for Reusing Intermediate Computation Results", International Symposium on Code Generation and Optimization, Los Alamitos, CA, 2004, pp. 277-288.

(Continued)

*Primary Examiner* — Lewis A Bullock, Jr.  
*Assistant Examiner* — Christine Dang  
(74) *Attorney, Agent, or Firm* — Yee & Associates, P.C.; Joseph Petrokaitis (57) ABSTRACT

A compiler method for exploiting data value locality for computation reuse. When a code region having single entry and exit points and in which a potential computation reuse opportunity exists is identified during runtime, a helper thread is created separate from the master thread. One of the helper thread and master thread performs a computation specified in the code region, and the other of the helper thread and master thread looks up a value of the computation previously executed and stored in a lookup table. If the value of the computation previously executed is located in the lookup table, the other thread retrieves the value from the table, and ignores the computation performed by the thread. If the value of the computation is not located, the other thread obtains a result of the computation performed by the thread and stores the result in the lookup table for future computation reuse.

27 Claims, 7 Drawing Sheets

(56) References Cited

OTHER PUBLICATIONS

Conners et al., "Compiler-directed Dynamic Computation Reuse: Rationale and Initial Results", Proceedings of the 32nd Annual ACM/IEEE International Symposium on Microarchitecture, Los Alamitos, CA, 1999, pp. 158-169.

Wu et al., "Better Exploration of Region-Level Value Locality with Integrated Computation Reuse and Value Prediction", 2001 IEEE, pp. 98-108.

Kandemir et al., "Compiler-Directed Code Restructuring for Reducing Data TLB Energy", CODES+ISSS'04, Sep. 8-10, 2004, Stockholm, Sweden, ACM, pp. 98-103.

Mohan et al., "Identifying and Exploiting Spatial Regularity in Data Memory References", Supercomputing 2003 ACM/IEEE Conference, Nov. 2003, pp. 1-11.

Pickett et al., "Compiler Analyses for Improved Return Value Prediction", Oct. 21, 2004, pp. 1-20. http://www.sable.mcgill.ca/~clump/research.html.

\* cited by examiner

```
;
double foo(int x) {
  int i;
  double sum = 0.0;

for (i=0; i<x; i++) {
  sum += sqrt( (double) i );
  }
  return (sum);
}
int main() {
  double result = 0.0;

// miss
  result += foo (10);
  // miss
  result += foo (50);
  // hit
  result += foo (10);
  // hit
  result += foo (50);

printf(" the result is %d\n", result);
  exit(0);
}
```

704

```
HashTable<int, double> CacheValueTable;

double foo(int x) {
  int i;
  double sum = 0.0;

HashIndex hi=0;
  If (CacheValueTable.Locate(x, hi)) {    ⟵ 706
    return (CacheValueTable[hi]);
  } for (i=0; i<x; i++) {
  sum += sqrt( (double) i );
  }

CacheValueTable.Add(x, sum, hi);   ⟵ 708
  return (sum);

}
int main(){
  double result = 0.0;

// miss
  result += foo (10);
  // miss
  result += foo (50);
  // hit
  result += foo (10);
  // hit
  result += foo (50);

printf(" the result is %d\n", result);
  exit(0);
}
```

*FIG. 7*

```
int foo (int n) {  /* 802 */
    int sum = 0;
    for (i=1; i<N; i++) {
        sum += i*i*i;
    }
    return sum;
}

(a)
```

```
Int foo(int x) {  /* 804 */
    Look up the table to get f(n);
                  n+k
    Compute T =    Σ    i³ code...
                 i=n+1

Return f(n) + T:
}
```

FIG. 8

```
int foo (int n) {  /* 902 */
    int sum = 0;
    for (i=1 ; i<N; i++) {
        sum += i*i*i;
    }
    return sum;
}

(a)
```

```
Int foo(int x) {  /* 904 */
    Spawn/activate a SMT thread   /* 906 */
    to lookup the hash table ...foo body code 1...
    Synchronize the SMT thread    /* 908 */
    to exit early if the value is in
    table ...foo body code 2 ...
    update HashTable [x];          /* 910 */
}
```

(a) Original code
void main() {
......other code

..... code region with value locality for input n and output r ~1002

..... other code
}

1000

(b) Compiler generated code int outlined_foo(void * data) { ~1004
  int n = (int) (* data);
  .... Code region with value locality for input n and output r
  return r;
} void main() {

......other code                                          1006 if (CheckHitRate (rate)) { //rate is less than the expected threshold
    return outlined_foo(&n);
  } else {
    int threadId = create_new_thread(outlinedfoo, &n);
// find a helper thread, and pass info to the runtime ~1008
    if (threadId != 0 ) { // helper thread is available
      If (LookupTable(n)) { // n is in the table already ~1012
        CancelResult(threadId); // invalidate the helper thread result
        TableBookKeeping(n); // update hit rate, etc.
        Set the result from the table                      1014
      } else { // n is not in the table
        r = (int)wait_value_from(threadId); // wait for the result from
//the helper thread
        TableBookKeeping(n); // Save n and the result in the table, do
//necessary replacement, update hit rate
      }
    } else { // no helper thread is available ~1010
      r = outlined_foo(&n);
    }
  }

....Other code
}

(c) Runtime code for helper thread ~1016
while(1) {
  If (there is new workitem) {
    mark self unavailable;
    execute the outlined function with input;
    If (Operation is not canceled) {
      mark results available;
    }
    mark self available;
  }
}

COMPILER METHOD OF EXPLOITING DATA VALUE LOCALITY FOR COMPUTATION REUSE

BACKGROUND OF THE INVENTION

1. Field of the Invention

The present invention relates generally to an improved data processing system, and in particular to a compiler method for exploiting data value locality for computation reuse.

2. Description of the Related Art

Modern microprocessors and software compilers employ many techniques to help increase the speed with which software executes. Values produced by executing instructions have been shown to exhibit a high degree of value locality in various benchmarks, such as SPEC95 and SPEC2000. The Standard Performance Evaluation Corporation (SPEC) is a non-profit corporation formed to establish, maintain and endorse a standardized set of relevant benchmarks that can be applied to the newest generation of high-performance computers. Value locality describes the likelihood of the recurrence of the same value within a storage location. Modern processors already exploit value locality in a very restricted way, e.g., the use of control speculation for branch predication, hardware table lookup, load-value prediction to guess the result of a load so that the dependent instructions can immediately proceed without having to wait for the memory access to complete, etc. Value locality has been exploited in compilers for code specialization, where value profiling at run-time is typically used to identify a semi-invariant variable, and the code is specialized to perform optimizations including constant folding, partial evaluation and loop versioning.

Furthermore, value locality exposes the opportunity of computation reuse, i.e., result memorization based on the fact that the same inputs with same operations applied should generate the same results. For instance, software programs often include many instructions that are executed multiple times each time the program is executed, and these programs typically have logical "regions" of instructions, each of which may be executed many times. When a region is one that is executed more than once, and the results produced by the region are the same for more than one execution, the region is a candidate for "reuse." The term "reuse" refers to the reusing of results from a previous execution of the region. For example, a computation reuse region could be a region of software instructions that, when executed, read a first set of registers and modify a second set of registers. The data values in the first set of registers are the "inputs" to the computation reuse region, and the data values deposited into the second set of registers are the "results" of the computation reuse region. A buffer holding inputs and results can be maintained for the region. Each entry in the buffer is termed an "instance." When the region is encountered during execution of the program, the buffer is consulted, and if an instance with matching input values is found, the results can be used without having to execute the software instructions in the computation reuse region. When reusing the results is faster than executing the software instructions in the region, performance improves.

Additionally, some modern compilers can operate on a program while it is being executed. This type of compiler is referred to as a dynamic compiler, and computer programming languages that are designed to support such activity may be referred to as "dynamically compiled languages".

Some modern compilers also use a technique known as profiling to improve the quality of code generated by the compiler. An example of a profiling technique is profile directed feedback (PDF). Profiling is usually performed by adding relevant instrumentation code to the program being compiled, and then executing that program to collect profiling data. Examples of profiling data include relative frequency of execution of one part of the program compared to others, values of expressions used in the program, and outcomes of conditional branches in the program. An optimizing compiler can use this data to perform code reordering, based on relative block execution frequencies, code specialization, based on value profiling, code block outlining, or other forms of optimization techniques that boost the final program's performance.

Traditional profile directed feedback optimizations require performing at least two separate steps: a compile instrumentation step with the representative training data to gather program behavior information (i.e., profile data), and a re-compile step to optimize the code based on the gathered profile data. This optimization approach has several limitations with usability, productivity, and adaptability. With existing profile directed feedback optimizations methods, multiple runs are needed to gather the profile data, the training data must be representative so that the program has similar behavior with real input data, and any input characteristic changes may have a negative performance impact.

SUMMARY OF THE INVENTION

The illustrative embodiments provide a computer implemented method, data processing system, and computer program product for exploiting data value locality for computation reuse. When a region of software code which has single entry and exit points and in which a potential computation reuse opportunity exists is identified during runtime, a helper thread is created which is separate from the master thread for the region of software code. One of the helper thread and master thread performs a computation specified in the region of software code, and the other of the helper thread and master thread looks up a value of the computation previously executed and stored in a lookup table. If the other of the helper thread and master thread locates the value of the computation previously executed in the lookup table, the other of the helper thread and master thread retrieves the value from the lookup table, and ignores the computation performed by the one of the helper thread and master thread. If the other of the helper thread and master thread does not locate the value of the computation in the lookup table, the other of the helper thread and master thread obtains a result of the computation performed by the one of the helper thread and master thread and stores the result in the lookup table for future computation reuse.

The illustrative embodiments also identify code regions in a computer program which have single entry and exit points and are executed with data value locality. A profitability cost of performing computations of each identified code region is estimated. A candidate list of the code regions for computation reuse is built based on the estimated profitability cost. The code regions in the candidate list are outlined, and a lookup table is built to hold values of computations performed for the code regions in the candidate list. The code regions in the candidate list are embedded with a procedure which spawns a helper thread, wherein one of the helper thread and a master thread performs computations in the code regions, while the other of the helper thread and master thread performs a lookup to locate a value of the computation previously stored in the lookup table. Multiple thread code is then generated comprising the embedded procedure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
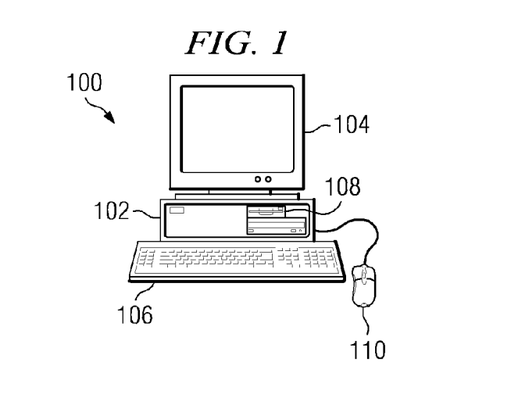
FIG. 1 depicts a pictorial representation of a computer system in which the illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
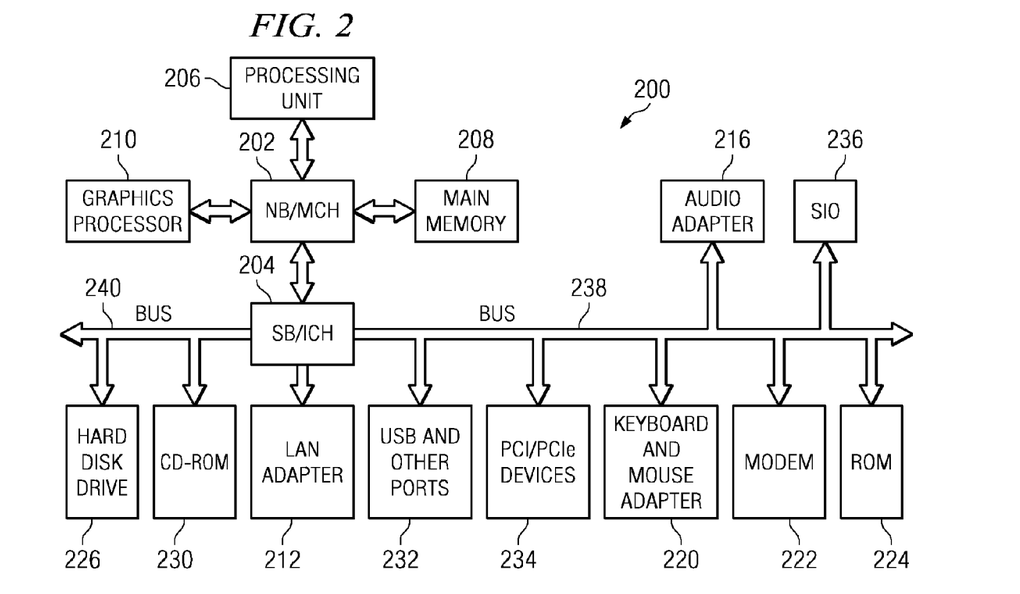
FIG. 2 is a block diagram of a data processing system in which the illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) and other ports 232. PCI/PCIe devices 234 are coupled to south bridge and I/O controller hub 204 through bus 238. Hard disk drive (HDD) 226 and CD-ROM 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

As used herein, the following terms have the following meanings:

A "compiler" is a computer program that translates a series of statements written in a first computer language into a second computer language, or somehow modifies the code of a computer program. A "compiler" can also be an "optimizing compiler."

An "entry point" is a section of code which is first executed when the software method containing the code is executed. An "entry point" can also be described as the prologue of a software method. An "entry point" is the code first executed when a software method is called and is responsible for tasks related to preparing to execute the body of the software method.

An "exit point" is a section of code which is last executed when the software method containing the code has executed. An "exit point" can also be described as the epilogue of a method. An "exit point" is code responsible for cleaning up a temporary state before returning to the call point after the software method has finished executing.

A "data value locality" describes the likelihood of the recurrence of a previously-seen value within a storage location.

A "thread" is a part of a program that can execute independently of other parts of the program. Operating systems that support multi-threading enable programmers to design programs whose threaded parts can execute concurrently. Sometimes, a portion of a program being concurrently executed is also referred to as a thread, as can the portion of the data processing system's resources dedicated to controlling the execution of that portion of the program.

The illustrative embodiments provide a computer implemented method and data processing system for exploiting data value locality for computation reuse in order to improve system performance and reduce power consumption. In particular, the illustrative embodiments provide a software approach of generating multiple thread code and using result memorization to identify computation reuse opportunities. The identification of a computation reuse opportunity may comprise a global analysis to identify a code region at different levels, such as a basic block, intra-procedure code region, or inter-procedure code region, which is frequently executed with high data value locality.

For instance, the compiler method performs the global analysis during runtime to determine when a software program reaches a point for a potential computation reuse. If a potential computation reuse is detected, the compiler method in the illustrative embodiments generates multiple thread code. Generating the multiple thread code comprises spawning a helper thread to perform the computational work, while the master thread attempts to locate the memorized results in a lookup table. The table lookup may be performed in a manner similar to interpolation in numerical analysis. If the master thread locates the result in the lookup table, the master thread immediately continues its operation and does not wait for the completion of the helper thread. The helper thread will be recycled later. However, if the master thread does not locate the result in the lookup table, the master thread waits for the result computed by the helper thread, and then updates the lookup table with the computed result in order to memorize the result for future computation reuse. Results computed at runtime by a helper thread are automatically cached, and the table lookup code and replacement policy in the software application are updated with the new result to record the frequently repeated values to reuse the computation. Furthermore, the code is self adaptive, i.e., the computation reuse will stop if it is discovered at runtime that there is no data value locality. Thus, when an application is compiled and run on multiple processors, performance overhead may be minimized since a previous computed result may be obtained by the master thread. The illustrative embodiments do not perform speculative computation to predict returned results, but instead perform real computations using the helper threads, and obtain the results of the real computations for computation reuse.

The compiler method described in the illustrative embodiments also provides profitability analysis of a computational reuse opportunity. A profitability analysis may be generated at compile time to estimate the extra overhead incurred from executing the table lookup code executed by the master thread, in addition to the original computation overhead performed by the helper thread, in order to determine that the extra overhead is still acceptable. With profitability analysis and dynamic profiling, a set of computed results for potential computation reuse and value locality may be memorized to improve system performance. As previously mentioned, dynamic profiling comprises collecting profiling data from an executing program for use in optimizing the program's performance. The compiler method may use a static cost model to perform the profitability analysis and generate an initial profitability estimate to exploit computation reuse, and use a runtime cost model to determine the result hit rate in the lookup table, replacement algorithm, and profitability estimate. For example, a static analysis based on underlying architecture configuration may be used to estimate the total cost of the computations $C(\Re)$ for each candidate code region $\Re$. The extra overhead $O(\Re)$ for computation reuse consists of the table lookup cost, helper thread cost, and the cost of outlining the code region. The table lookup cost depends on the use and definition (use-def) set of the code region, the value range information, the lookup table size, and the bookkeeping overhead. The overhead percentage $$R(\mathcal{R}) = \frac{O(\mathcal{R})}{C(\mathcal{R})}$$

should be less than the threshold T. For example, if T=0.1, the overall performance degradation will be less than 10% even in the worst case scenario (i.e., no result is located in the lookup table for the computation). Although the example above uses a particular value of threshold T, any suitable threshold value may be used for comparison against the overhead percentage.

The compiler method may be integrated into a dynamic compiling environment with continuous program optimization, wherein each computation reuse opportunity is identified precisely and adjusted dynamically to adopt any underlying system changes, input changes, etc.

Figure 3:
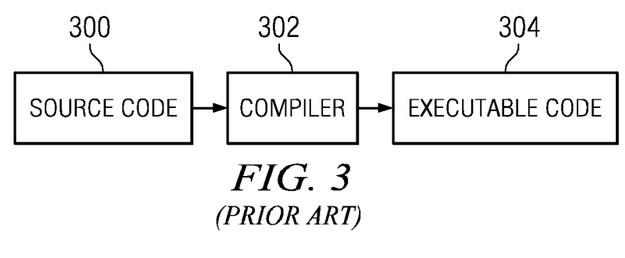
FIG. 3 is a block diagram of a compiler in which the illustrative embodiments may be implemented.

FIG. 3 is a block diagram showing the operation of a known compiler. Compilers are software programs that modify a second program. For example, a compiler can transform a computer program written in a language more easily understandable to humans into a language more easily used by a computer. In this example, compiler 302 is said to compile source code 300 into executable code 304.

Source code 300 is created by one or more of a number of known techniques, such as automatically, or by a human programmer. Compiler 302 and executable code 304 are computer usable programs that can be used in a data processing system, such as data processing system 100 in FIG. 1 or data processing system 200 in FIG. 2.

Source code 300 defines how a program will eventually operate, but source code 300 is usually not in a desired format for execution on a data processing system. Instead, source code 300 is often in a format that is easier for a human to interpret. After source code 300 has been defined, source code 300 is provided to compiler 302. A typical compiler is a computer program that translates a series of statements written in a first computer language, such as source code 300, into a second computer language, such as executable code 304. The second computer language, such as executable code 304, is often called the object or target language.

Thus, compiler 302 is, itself, a computer program designed to convert source code 300 into executable code 304. After compiler 302 has performed its programmed actions on source code 300, compiler 302 outputs executable code 304. Executable code 304 is generally in a desired computer-usable format and is ready for use in a data processing system.

Typical compilers output objects that contain machine code augmented by information about the name and location of entry points and external calls to functions not contained in the object. A set of object files, which need not have come from a single compiler provided that the compilers used share a common output format, may then be linked together to create the final executable code. The executable code can then be run directly by a user. When this process is complex, a build utility is often used. Note that because the entry point in general only reads from a global state, then known techniques to allow multiple simultaneous readers could be used as an enhancement.

Most compilers translate a source code text file, written in a high level language, to object code or machine language, e.g. into an executable .EXE or .COM file that may run on a computer or a virtual machine. However, translation from a low level language to a high level language is also possible. Such a compiler is normally known as a decompiler if the compiler is reconstructing a high level language program which could have generated the low level language program. Compilers also exist which translate from one high level language to another, or sometimes to an intermediate language that still needs further processing. These latter types of compilers are known as transcompilers, or sometimes as cascaders.

Figure 4:
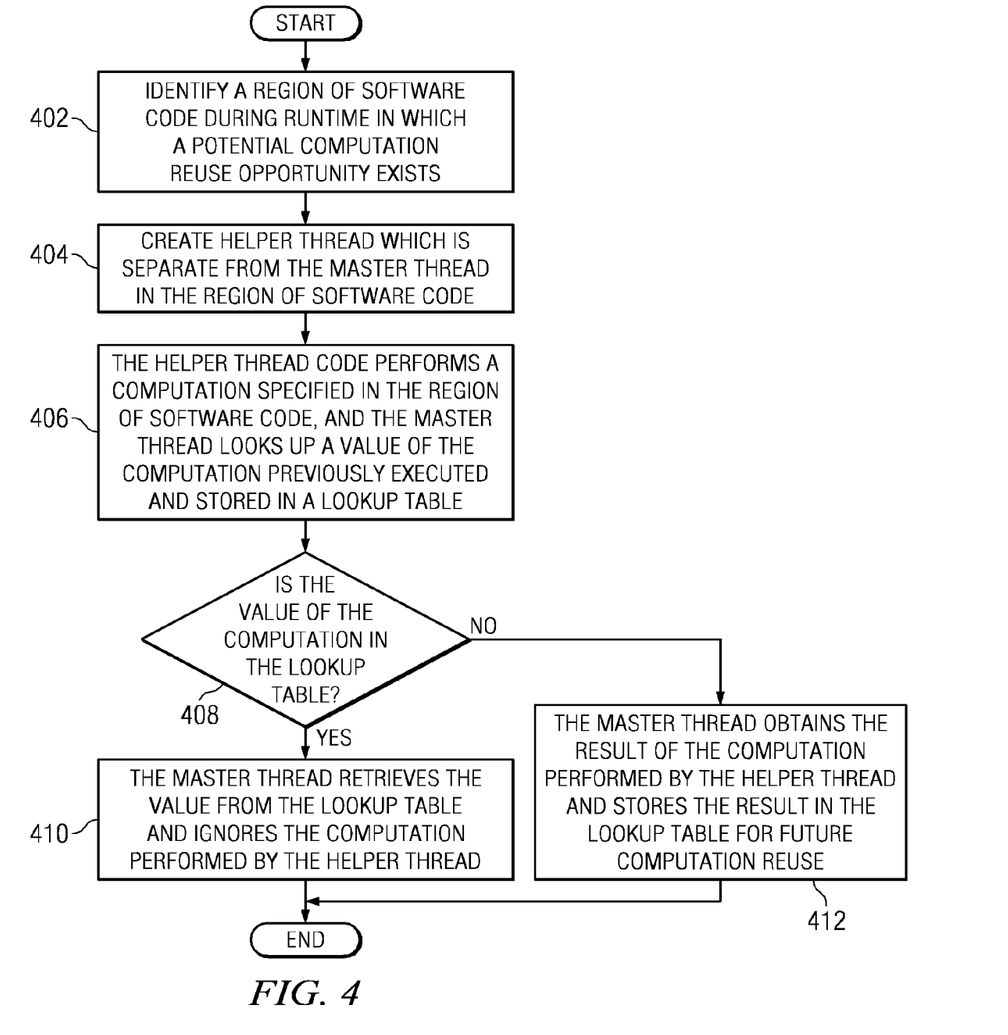
FIG. 4 is a flowchart of a process for computation reuse in a region of software code in accordance with the illustrative embodiments.

FIG. 4 is a flowchart of a process for computation reuse in a region of software code in accordance with the illustrative embodiments. The process described in FIG. 4 may be implemented in a compiler, such as compiler 302 in FIG. 3. The process shown in FIG. 4 may be executed on a data processing system, such as data processing system 100 in FIG. 1 or data processing system 200 in FIG. 2.

The process begins by identifying a region of software code during runtime in which a potential computation reuse opportunity exists (step 402). A helper thread is created which is separate from the master thread for the region of software code (step 404). The helper thread performs a computation specified in the region of software code, and the master thread checks a lookup table to determine if the computation was previously executed and the result stored in a lookup table (step 406). A determination is made as to whether the master thread located the value of the computation previously executed in the lookup table (step 408). If the master thread located a value of the computation previously executed in the lookup table ('yes' output of step 408), the master thread retrieves the value from the lookup table and ignores the computation performed by the helper thread (step 410), with the process terminating thereafter.

Turning back to step 408, if the master thread does not locate a value from a previously executed computation in the lookup table ('no' output of step 408), the master thread obtains the result of the computation performed by the helper thread and stores the result in the lookup table for future computation reuse (step 412).

Figure 5:
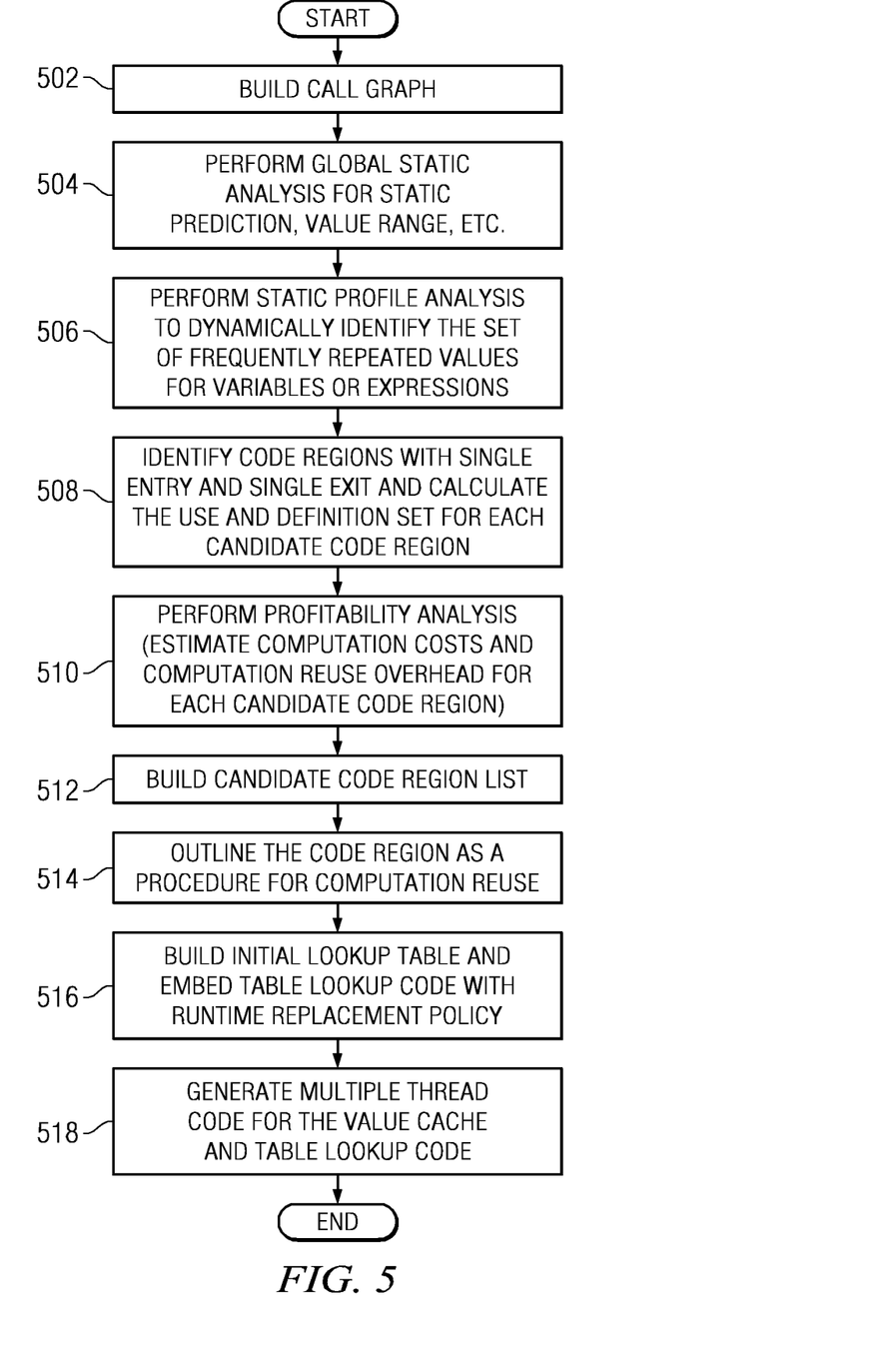
FIG. 5 is a flowchart of a process for exploiting data value locality for computation reuse in accordance with the illustrative embodiments.

FIG. 5 is a flowchart of a process for exploiting data value locality for computation reuse in accordance with the illustrative embodiments. The process described in FIG. 5 may be implemented in a compiler, such as compiler 302 in FIG. 3. The process shown in FIG. 5 may be executed on a data processing system, such as data processing system 100 in FIG. 1 or data processing system 200 in FIG. 2.

The first stage of the process comprises identifying code regions in a software program for computation reuse. The process begins with the compiler building a call graph for each procedure in the program (step 502). A call graph is a directed graph that represents the calling relationships among subroutines in a computer program. Building the call graph may include building a control flow graph, which is a representation of all paths that might be traversed through the program during its execution, and a data flow graph which is a representation of the possible set of values calculated at various points in the program.

After the control flow graph and data flow graph are built for the process, the compiler initiates a global static analysis to identify a set of variables which shows data value locality (step 504). The global analysis allows for identification of a computation reuse opportunity by identifying those code regions which are frequently executed with high data value locality. The global static analysis may include value range analysis and propagation. Value range analysis is an algorithm which tracks the changes to a variable at each point of a program. Value range propagation is an algorithm which propagates the range of a variable at one point to the other based on the program control flow.

Next, the compiler performs a static profile analysis to identify the set of highly frequently repeated computation result values for variables or expressions (step 506). The frequently repeated computation result values may be identified by performing the static profile analysis in cooperation with dynamic value profiling. Static profile analysis may identify a code region which has good value locality—it is frequently executed with frequently repeated inputs, and the range of the inputs may also be estimated approximately in some cases. At runtime, the possible values may be gathered through training data. The dynamic value profiling information may be fed back to the compilers for the compilers to make use of it.

The compiler searches the code regions of the program to identify those code regions having a single entry and single exit point, and calculate each region's use and definition set (step 508). A code region may be a subset of another code region. For each identified code region, the execution frequency, the use and definition set, and the value range information is maintained. The execution frequency is the frequency of each edge in the region and may be determined through static profiling analysis. The frequency of the code region entry edge is recorded. Using dynamic value profiling, a more precise frequency may be obtained for each code region. The use and definition (use-def) set is a data structure that consists of a use of a variable and the definitions for the variable. The value range information comprises range information for each input variable and may be determined through static value range analysis. It should be noted the self-adaptive code in the illustrative embodiments is outlined as a procedure from a computation reuse code region. The computation reuse will cease if it is discovered at runtime that there is no data value locality for a given code region.

Once the code regions are identified, the second stage of the process comprises performing the static profitability analysis (step 510). For each candidate code region $\mathcal{R}$, the static profitability analysis based on the underlying architecture configuration is used to estimate the total cost of the computations $C(\mathcal{R})$. The extra overhead $O(\mathcal{R})$ for the computation reuse consists of the table lookup cost, helper thread cost, and the cost of outlining the code region. The table lookup cost depends on the use-def set of the code region, the value range information, the lookup table size, and the bookkeeping overhead. The computation reuse rate $$R(\mathcal{R}) = \frac{O(\mathcal{R})}{C(\mathcal{R})}$$

should be less than the threshold T. For example, if T=0.1, the overall performance degradation will be less than 10% even in the worst case scenario (i.e., no result is located in the lookup table for the computation). Although the example above uses a particular value of threshold T, any suitable threshold value may be used for comparison against the overhead percentage.

After the profitability analysis is performed, the third stage of the process comprises generating efficient code by building a candidate list of the code regions for computation reuse (step 512). Each code region is outlined as a procedure for computation reuse (step 514). The compiler then builds an initial lookup table and embeds the table lookup code into the outlined procedure with a runtime replacement policy (step 516). The lookup table is a data structure that associates keys with values. The primary operation for the table is a lookup: given a key, find the corresponding value. The lookup table has a limited size, i.e., the table can hold a limited number of input values and corresponding output values. The runtime replacement policy takes into account both recency and frequency of accesses to replace an old value with the new value in the lookup table. The compiler may then generate multiple thread code for the value cache and the table lookup code (step 518), with the process terminating thereafter.

Figure 6:
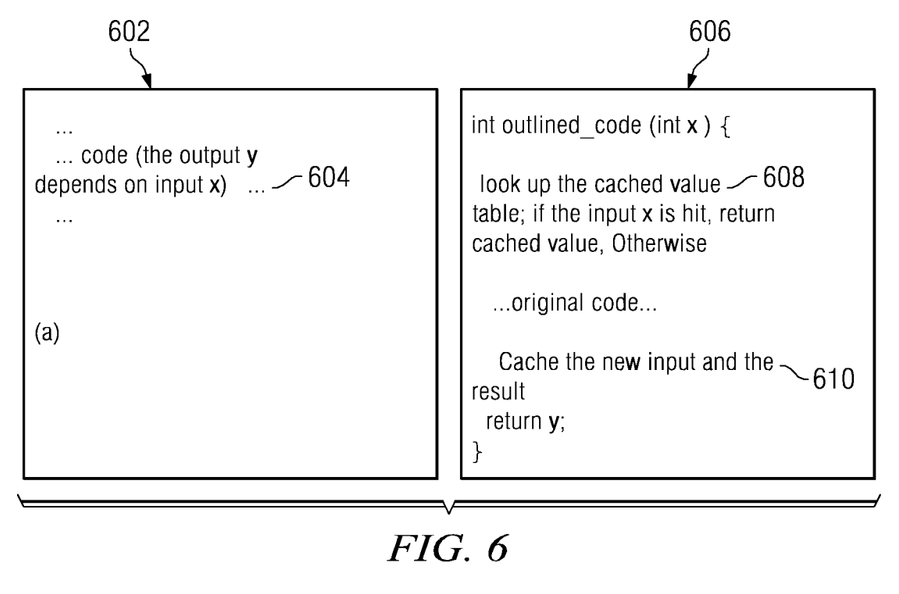
FIG. 6 provides a high-level overview of pseudo code comprising a high value locality and embedded table lookup code in accordance with the illustrative embodiments.

FIG. 6 provides a high-level overview of the table lookup code in accordance with the illustrative embodiments for single thread implementation. In particular, FIG. 6 illustrates pseudo code comprising a high value locality and the corresponding embedded table lookup code for computation reuse. The pseudo code shown in FIG. 6 may be used in conjunction with the techniques described with respect to FIGS. 4 and 5. The pseudo code may be fed into a compiler, such as compiler 302 in FIG. 3. The output from the compiler may include various code formats, including, among others, an executable format.

As shown, pseudo code 602 comprises computation 604. Computation 604 in this illustrative example is a code region which generates an output Y that depends on a particular input X. Computation 604 may be identified by the compiler as a computation reuse opportunity. In other words, the compiler may identify that the set of variables in computation 604 shows data value locality.

When the computation reuse opportunity is identified, the compiler may outline the computation code to form outlined code 606. Outlined code 606 comprises table lookup code 608 which performs a lookup in the lookup table (e.g., cache value table) to locate a computation result previously determined by the output Y generated for similar code. If table lookup code 608 determines that the result is in the cache value table, the memorized or cached value is returned, and the original code continues to execute as usual. However, if the result is not found in the cache value table, outlined code 606 performs the original computation and executes embedded cache code 610 to cache the computed value automatically in the cache value table.

Figure 7:
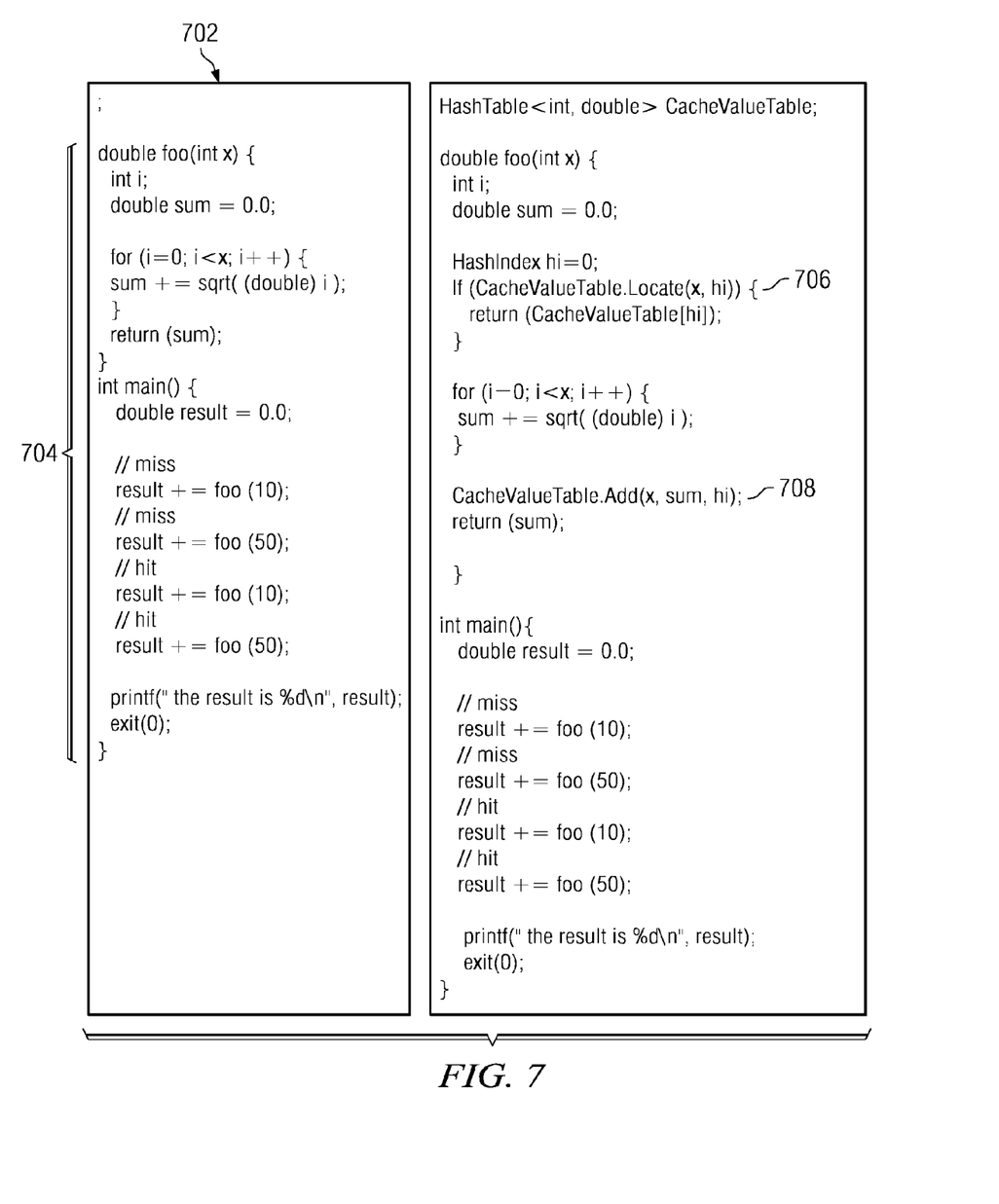
FIG. 7 illustrates single thread code identified for computational reuse and the corresponding table lookup code in accordance with the illustrative embodiments.

FIG. 7 illustrates a single thread code identified for computational reuse and the corresponding table lookup code in accordance with the illustrative embodiments. The single thread code shown in FIG. 7 may be used in conjunction with the techniques described with respect to FIGS. 4 and 5. Both the table lookup and the original computation are performed within the single thread code.

Candidate code region 702 is shown to comprise foo( ) procedure 704. In this illustrative example, the entire foo( ) procedure 704 has been identified by the compiler for computation reuse. The compiler embeds table lookup code 706 and cache code 708 into the candidate code region. Like outlined code 606 in FIG. 6, table lookup code 706 performs a lookup in the cache value table of input variable X to locate a previously generated result based on the input. If the input variable X is located in the cache value table, the corresponding result in the table is returned. If the input variable X is not found, cache code 708 is executed to add the result computed by the thread to the cache value table.

Figure 8:
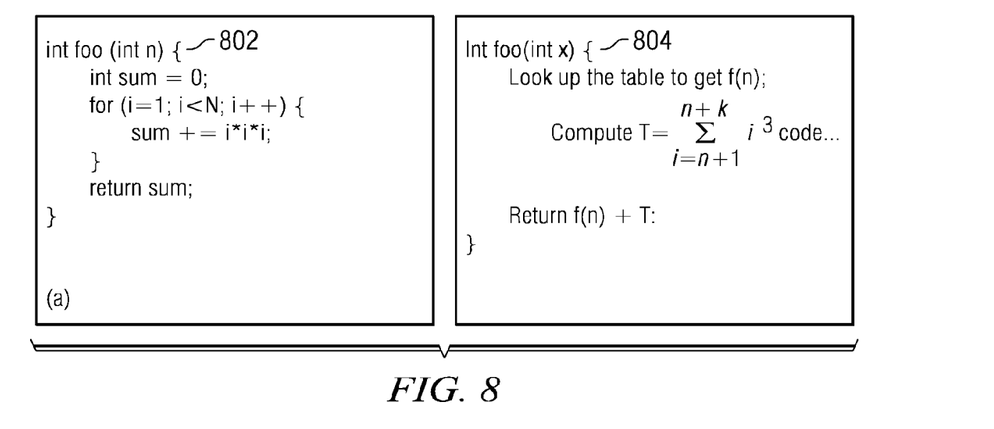
FIG. 8 illustrates code for determining costs associated with the computational reuse for a single thread code in accordance with the illustrative embodiments.

FIG. 8 illustrates how a compiler may identify a computation reuse opportunity so that a new computation may be reduced by computing the new value using closely related value in the table in a manner similar to interpolation in numerical analysis. The code shown in FIG. 8 may be used in conjunction with the techniques described with respect to FIGS. 4 and 5. In this illustrative example, foo( ) procedure 802 comprises a computation $$f(n) = \sum_{i=1}^{n} i^3$$

which identifies a value of "i" between "1" and "n", and calculates a result comprising the cube of the "i" value. The cache value table may be built up by caching a few of values f(n).

The result of f(n+k) is $$f(n) + \sum_{i=n+1}^{n+k} i^3$$

where the value f(n) is already saved in the lookup table. As shown, foo( ) procedure 804 is embedded with the computation for equation $$T = \sum_{i=n+1}^{n+k} i^3$$

and table lookup for f(n). The computation f(n+k) may be reduced to the table lookup f(n) and the computation T.

Figure 9:
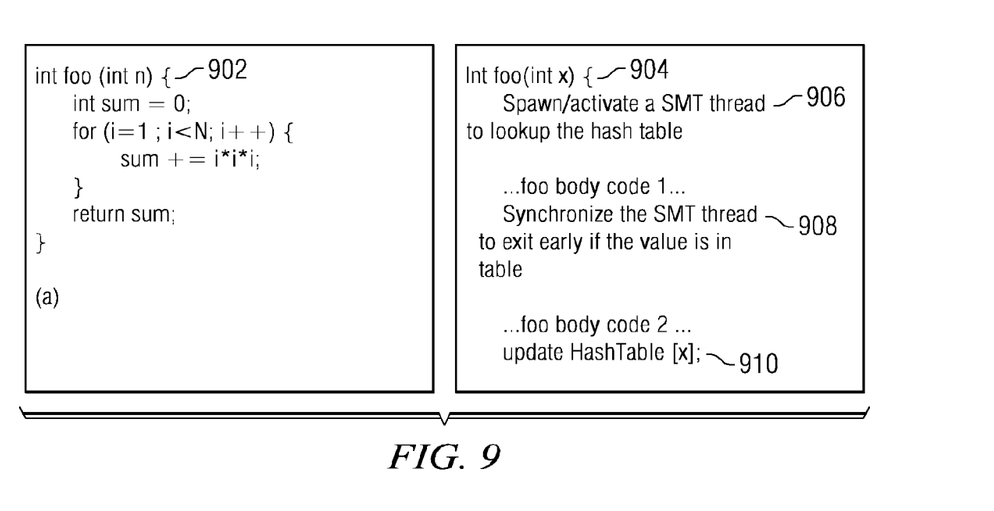
FIG. 9 illustrates multiple thread code wherein the master thread performs the original computation and a helper thread is spawned to perform the table lookup in accordance with the illustrative embodiments.

FIG. 9 illustrates multiple thread code wherein the master thread performs the original computation and a helper thread is spawned to perform the table lookup in accordance with the illustrative embodiments. The multiple thread code shown in FIG. 9 may be used as an alternative to the multiple thread code described below in FIG. 10. The multiple thread code shown in FIG. 9 may be used in conjunction with the techniques described with respect to FIGS. 4 and 5. In this illustrative example, multiple thread code 904 comprises separate threads for performing the table lookup and the original computation. Separate threads may be used to perform these different tasks since the overhead of spawning a thread or activating a thread is less than the overhead of the table lookup code. This multiple thread approach is especially promising for architectures where hardware supports fast thread spawn and join.

Like FIG. 8, foo( ) procedure 902 comprises a computation which identifies a value of "i" between "1" and "N", and calculates a result comprising the square of the "i" value. However, for the table lookup and original computation, foo( ) procedure 902 is updated in multiple thread code 904 to spawn or activate a simultaneous multiprocessor thread (SMT) which performs the table lookup 906. Thus, while the master thread performs the original computation, the spawned helper thread performs the table lookup. The master thread checks the returned value from the helper thread. If the helper thread locates the result in the lookup table, the master thread ceases the computation operation and continues with the procedure 908. If the result is not located in the lookup table, the master thread continues the computation since no data value locality exists. The master thread then updates the lookup table with the computed result in order to cache the result for future computation reuse 910.

Figure 10:
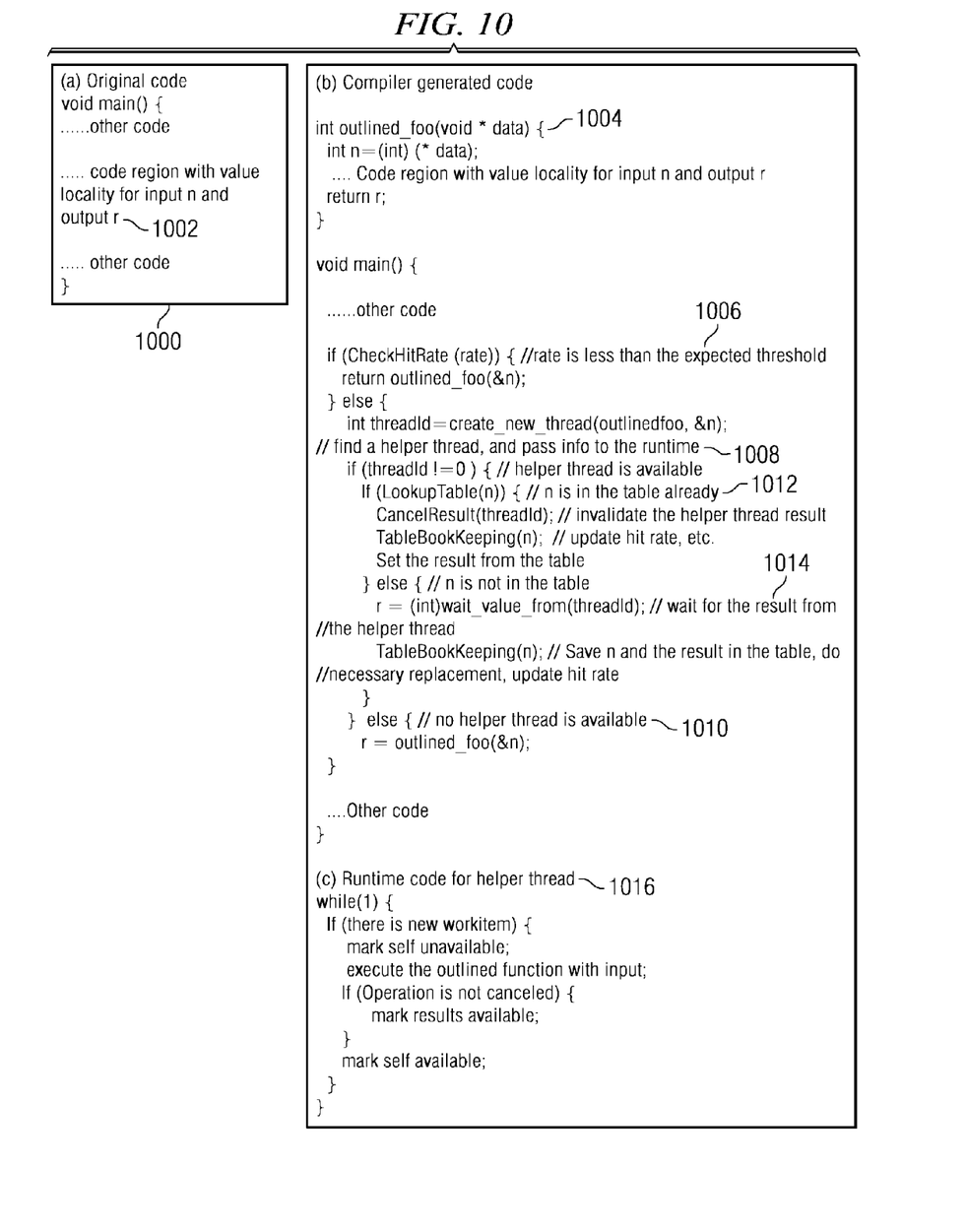
FIG. 10 illustrates multiple thread code wherein the master thread performs the table lookup and a helper thread is spawned to perform the original computation in accordance with the illustrative embodiments.

FIG. 10 illustrates multiple thread code wherein the helper thread is spawned to perform the original computation and the master thread performs the table lookup in accordance with the illustrative embodiments. The multiple thread code shown in FIG. 10 provides a more efficient way of multi-threading than the multiple thread code in FIG. 9. The multiple thread code shown in FIG. 10 may be used in conjunction with the techniques described with respect to FIGS. 4 and 5.

FIG. 10 comprises original code 1000. When a computation reuse code region 1002 in original code 1000 is identified by the compiler, the compiler outlines computation reuse code region 1002 as a procedure outlined_foo( ) in 1004 after performing a static profitability analysis and determining whether the extra overhead for the computation reuse comprising the table lookup cost, helper thread cost, etc., is less than the expected threshold. In 1006, the master thread in the compiler generated code checks the overall computation reuse ratio of the region recorded so far dynamically to determine if it is profitable to spawn a helper thread for the computation.

If the computation reuse rate is greater than the threshold, a new helper thread is created (or a previously created thread is made available) in 1008 and a thread identifier (threadId) is returned. If no resource is available for a helper thread, the master thread performs its own computation by invoking outlined_foo(&n) in 1010. Otherwise, a separate thread (helper thread) is spawned to perform the computation by passing the outline procedure outlined_foo(&n) and its argument to the runtime, and the master thread performs the table lookup. If the computation value is located in the table in 1012, the master thread retrieves the value from the table and continues the rest of the computation while ignoring the helper thread. If the value is missing in the table, the master thread waits for the helper thread returning the value 1014 to continue the computation.

In the runtime system 1016, a pool of helper threads may be created as the program is started. The helper threads wait for a new work item sent from the master thread. A work item is defined as an outlined procedure and the procedure's corresponding input parameters. When a helper thread receives a work item, the thread will mark itself as unavailable, and will begin the computation to finish the work item. Subsequently, the thread checks if the computation operation is cancelled by the master thread to send the results to the master thread and mark itself as available again.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for computation reuse in a region of software code, the computer implemented method comprising:
    identifying a region of software code during runtime which has single entry and exit points and in which a potential computation reuse opportunity exists;
    creating a helper thread separate from a master thread for the region of software code, wherein one of the helper thread and master thread performs a computation specified in the region of software code, and wherein the other of the helper thread and master thread looks up a value of the computation previously executed and stored in a lookup table;
    responsive to the other of the helper thread and master thread locating the value of the computation previously executed in the lookup table, retrieving the value from the lookup table, wherein the other of the helper thread and master thread ignores the computation performed by the one of the helper thread and master thread; and
    responsive to a failure of the other of the helper thread and master thread to locate the value of the computation in the lookup table, obtaining a result of the computation performed by the one of the helper thread and master thread and storing the result in the lookup table for future computation reuse.

2. The computer implemented method of claim 1, wherein a potential computation reuse opportunity exists if the region of software code comprises a data value locality.

3. The computer implemented method of claim 1, further comprising:
    creating a pool of helper threads when the software code is initialized, wherein each helper thread waits to receive a work item comprising an outlined procedure and corresponding input parameters from the master thread.

4. The computer implemented method of claim 3, further comprising:
    marking a helper thread as unavailable when the helper thread receives a work item from the master thread.

5. The computer implemented method of claim 1, further comprising:
    automatically caching the result of the computation performed by the one of the helper thread and master thread.

6. The computer implemented method of claim 1, further comprising:
    responsive to a failure to identify a region of software code during runtime in which a potential computation reuse opportunity exists, ceasing the computation reuse.

7. A computer implemented method for generating multiple thread code for computation reuse, the computer implemented method comprising:
    identifying code regions in a computer program which have single entry and exit points and are executed with data value locality;
    estimating a profitability cost of performing computations of each identified code region;
    building a candidate list of the code regions for computation reuse based on the estimated profitability cost;
    outlining the code regions in the candidate list;
    building a lookup table to hold values of computations performed for the code regions in the candidate list;
    embedding the code regions in the candidate list with a procedure which spawns a helper thread, wherein an embedded procedure is created, wherein one of the helper thread and a master thread performs computations in the code regions while the other of the helper thread and master thread performs a lookup to locate values of the computations previously stored in the lookup table; and
    generating multiple thread code comprising the embedded procedure.

8. The computer implemented method of claim 7, wherein identifying a code region further comprises:
    building a call graph for each process in the computer program;
    identifying variables in the code regions which show data value locality; and
    determining values of computations for the identified variables.

9. The computer implemented method of claim 8, wherein the call graph represents calling relationships among subroutines in the computer program.

10. The computer implemented method of claim 8, wherein building the call graph includes building a control flow graph and a data flow graph.

11. The computer implemented method of claim 8, wherein the values are determined using dynamic value profiling.

12. The computer implemented method of claim 7, wherein the code region is a subset of another code region.

13. The computer implemented method of claim 7, further comprising:
    responsive to a determination that no data value locality exists for a given code region, terminating the computation reuse.

14. A data processing system for computation reuse in a region of software code, the data processing system comprising:
    a bus;
    a storage device coupled to the bus, wherein the storage device contains computer usable code;
    at least one managed device coupled to the bus;
    a communications unit coupled to the bus; and a processing unit coupled to the bus, wherein the processing unit executes the computer usable code to identify a region of software code during runtime which has single entry and exit points and in which a potential computation reuse opportunity exists; create a helper thread separate from a master thread for the region of software code to cause one of the helper thread and master thread to perform a computation specified in the region of software code and to cause the other of the helper thread and master thread to look up a value of the computation previously executed and stored in a lookup table; retrieve the value from the lookup table in response to the other of the helper thread and master thread locating the value of the computation previously executed in the lookup table, wherein the other of the helper thread and master thread ignores the computation performed by the one of the helper thread and master thread; and, in response to a failure of the other of the helper thread and master thread to locate the value of the computation in the lookup table, obtain a result of the computation performed by the one of the helper thread and master thread and store the result in the lookup table for future computation reuse.

15. A data processing system for generating multiple thread code for computation reuse, the data processing system comprising:
a bus;
a storage device coupled to the bus, wherein the storage device contains computer usable code;
at least one managed device coupled to the bus;
a communications unit coupled to the bus; and
a processing unit coupled to the bus, wherein the processing unit executes the computer usable code to identify code regions in a computer program which have single entry and exit points and are executed with data value locality; estimate a profitability cost of performing computations of each identified code region; build a candidate list of the code regions for computation reuse based on the estimated profitability cost; outline the code regions in the candidate list; build a lookup table to hold values of computations performed for the code regions in the candidate list; embed the code regions in the candidate list with a procedure which spawns a helper thread to create an embedded procedure, wherein one of the helper thread and a master thread performs computations in the code regions while the other of the helper thread and master thread performs a lookup to locate values of the computations previously stored in the lookup table; and generate multiple thread code comprising the embedded procedure.

16. A non-transitory computer readable storage medium storing a computer program product for computation reuse in a region of software code, the computer program product comprising:
computer usable program code for identifying a region of software code during runtime which has single entry and exit points and in which a potential computation reuse opportunity exists;
computer usable program code for creating a helper thread separate from a master thread for the region of software code, for causing one of the helper thread and master thread to perform a computation specified in the region of software code, and for causing the other of the helper thread and master thread to look up a value of the computation previously executed and stored in a lookup table;
computer usable program code for retrieving the value from the lookup table and causing the other of the helper thread and master thread to ignore the computation performed by the one of the helper thread and master thread in response to the other of the helper thread and master thread locating the value of the computation previously executed in the lookup table; and
computer usable program code for obtaining a result of the computation performed by the one of the helper thread and master thread and storing the result in the lookup table for future computation reuse in response to a failure of the other of the helper thread and master thread to locate the value of the computation in the lookup table.

17. The non-transitory computer readable storage medium of claim 16, wherein a potential computation reuse opportunity exists if the region of software code comprises a data value locality.

18. The non-transitory computer readable storage medium of claim 16, further comprising:
computer usable program code for creating a pool of helper threads when the software code is initialized, wherein each helper thread waits to receive a work item comprising an outlined procedure and corresponding input parameters from the master thread.

19. The non-transitory computer readable storage medium of claim 18, further comprising:
computer usable program code for marking a helper thread as unavailable when the helper thread receives a work item from the master thread.

20. The non-transitory computer readable storage medium of claim 16, further comprising:
computer usable program code for automatically caching the result of the computation performed by the one of the helper thread and master thread.

21. The non-transitory computer readable storage medium of claim 16, further comprising:
computer usable program code for ceasing the computation reuse in response to a failure to identify a region of software code during runtime in which a potential computation reuse opportunity exists.

22. A non-transitory computer readable storage medium storing a computer program product for generating multiple thread code for computation reuse, the computer program product comprising:
computer usable program code for identifying code regions in a computer program which have single entry and exit points and are executed with data value locality;
computer usable program code for estimating a profitability cost of performing computations of each identified code region;
computer usable program code for building a candidate list of the code regions for computation reuse based on the estimated profitability cost;
computer usable program code for outlining the code regions in the candidate list;
computer usable program code for building a lookup table to hold values of computations performed for the code regions in the candidate list;
computer usable program code for embedding the code regions in the candidate list with a procedure for spawning a helper thread during execution of the computer program product to create an embedded procedure, and for causing, during execution of the computer program product, one of the helper thread and a master thread to perform computations in the code regions while causing the other of the helper thread and master thread to perform a lookup to locate values of the computations previously stored in the lookup table; and computer usable program code for generating multiple thread code comprising the embedded procedure.

23. The non-transitory computer readable storage medium of claim 22, wherein identifying a code region further comprises:

computer usable program code for building a call graph for each process in the computer program;

computer usable program code for identifying variables in the code regions which show data value locality; and computer usable program code for determining values of computations for the identified variables.

24. The non-transitory computer readable storage medium of claim 23, wherein the call graph represents calling relationships among subroutines in the computer program.

25. The non-transitory computer readable storage medium of claim 23, wherein building the call graph includes building a control flow graph and a data flow graph.

26. The computer implemented method of claim 1, wherein the helper thread does not perform speculative computation to predict returned results, but instead performs real computations, and wherein the helper thread obtains results of real computations for computation reuse.

27. The computer implemented method of claim 1, wherein the method is performed while the software code is currently being compiled.

\* \* \* \* \*